(12) United States Patent
Cherubini et al.

(10) Patent No.: US 9,218,839 B2
(45) Date of Patent: Dec. 22, 2015

(54) OPERATING A TAPE STORAGE DEVICE

(71) Applicant: International Business Machines Corporation, Armonk, NY (US)

(72) Inventors: Giovanni Cherubini, Rueschlikon (CH); Jens Jelitto, Rueschlikon (CH); Angeliki Pantazi, Rueschlikon (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/387,572

(22) PCT Filed: Apr. 24, 2013

(86) PCT No.: PCT/IB2013/053237
§ 371 (c)(1),
(2) Date: Sep. 24, 2014

(87) PCT Pub. No.: WO2013/160847
PCT Pub. Date: Oct. 31, 2013

(65) Prior Publication Data
US 2015/0131180 A1 May 14, 2015

(30) Foreign Application Priority Data

Apr. 27, 2012 (GB) .................... 1207338.3

(51) Int. Cl.
*G11B 5/588* (2006.01)
*G11B 5/584* (2006.01)
*G11B 5/008* (2006.01)

(52) U.S. Cl.
CPC ............ *G11B 5/588* (2013.01); *G11B 5/00817* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 4,996,609 A | 2/1991 | Joannou | |
| 5,229,895 A | 7/1993 | Schwarz et al. | |
| 6,430,008 B1 | 8/2002 | Trabert et al. | |
| 7,876,521 B2 * | 1/2011 | Cherubini et al. | 360/71 |
| 7,957,088 B1 | 6/2011 | Bui et al. | |
| 7,961,421 B1 * | 6/2011 | Bui et al. | 360/76 |
| 8,643,975 B2 * | 2/2014 | Cherubini et al. | 360/76 |
| 8,891,198 B2 * | 11/2014 | Bui et al. | 360/77.12 |

(Continued)

FOREIGN PATENT DOCUMENTS

| | | |
|---|---|---|
| WO | 2011077340 A1 | 6/2011 |
| WO | 2011101197 A1 | 8/2011 |

OTHER PUBLICATIONS

PCT International Search Report, International Application No. PCT/IB2013/053237; International Filing Date: Apr. 24, 2013; Date of Mailing: Oct. 3, 2013, pp. 1-3.

(Continued)

*Primary Examiner* — K. Wong
(74) *Attorney, Agent, or Firm* — Cantor Colburn LLP

(57) ABSTRACT

An apparatus for operating a tape storage device comprises a first tape skew determination unit for providing a first tape skew value concerning a skew of a tape in the tape storage device, and a second tape skew determination unit for providing a second tape skew value concerning the skew of the tape. An actuator adjusts one or more of a rotational orientation of a tape head of the tape storage device which tape head is provided for reading and/or writing data from/to the tape, and a motion direction of the tape dependent on the first tape skew value and the second tape skew value.

18 Claims, 5 Drawing Sheets

(56) References Cited

U.S. PATENT DOCUMENTS

| | | |
|---|---|---|
| 2002/0163752 A1 | 11/2002 | Peterson |
| 2006/0103968 A1 | 5/2006 | Jurneke et al. |
| 2007/0230033 A1 | 10/2007 | McAllister et al. |
| 2007/0285831 A1 | 12/2007 | Goker et al. |
| 2008/0002280 A1 | 1/2008 | Asakura et al. |
| 2009/0097153 A1 | 4/2009 | Day et al. |
| 2009/0213489 A1 | 8/2009 | Bui et al. |
| 2010/0302677 A1 | 12/2010 | Bates et al. |
| 2010/0315740 A1 | 12/2010 | Bates et al. |
| 2011/0007413 A1 | 1/2011 | Cherubini et al. |
| 2011/0199701 A1 | 8/2011 | Bui et al. |

OTHER PUBLICATIONS

PCT International Search Report and Written Opinion; International Application No. PCT/IB2013/053237; International Filing Date: Apr. 24, 2013; Date of Mailing: Oct. 3, 2013; pp. 1-10.

UK Search Report; Intellectual Property Office; Application No. GB1213366.6; Patents Act 1977: Search Report under Section 17(5); Date Mailed: Nov. 27, 2012, pp. 1-3.

* cited by examiner

OPERATING A TAPE STORAGE DEVICE

NATIONAL STAGE PRIORITY

This is a U.S. national stage of application No. PCT/IB2013/053237, filed on Apr. 24, 2013. Priority under 35 U.S.C. §119(a) and 35 U.S.C. §365(b) is claimed from Great Britain Patent Application No. 1207338.3, filed Apr. 27, 2012, and all the benefits accruing therefrom under 35 U.S.C. §119, the contents of which in its entirety are herein incorporated by reference.

BACKGROUND

The present invention relates to an apparatus and to a method for operating a tape storage device, and to a related computer program product.

In tape storage devices data typically is written to and read from a tape inserted into a tape drive of the tape storage device. The tape may be preformatted into data bands and servo bands extending next to each other in a motion direction of the tape. While the data bands provide data tracks for writing data to, the servo bands comprise prerecorded servo patterns, also denoted in a more general way as servo information, which servo information may be read by a reading element of the tape head for gaining information about a lateral position of the tape with respect to a reference position. Lateral in this context is meant orthogonal to a reference motion direction of the tape. A deviation of the lateral position from the reference position detected with the aid of the read element is also denoted as position error signal PES in this technical field. Such information, and specifically the PES, may be provided to a feedback controller, also denoted as lateral position feedback controller which converts the PES into a control signal for a realigning between the tape head and a data track currently read or written and specifically its track centerline for enabling a correct reading and writing of data. As a result, a closed-loop control system for a continuing alignment of the tape head and the tape is provided which is also denoted as closed-loop track-follow control system.

One of the key challenges for such a closed-loop track-follow control system originates from lateral vibrations of the tape. In traditional tape paths, flanged rollers are used for constraining a lateral tape motion during a transport of the tape from a supply reel to a take-up reel. Although the use of flanged rollers constrains the tape and limits lateral tape motion during operation, debris accumulation may be introduced at the flanges that not only may affect the lifetime of the tape, but may also create undesirable dynamic effects due to a contact of the tape edge with guiding elements such as flanges. These effects may be alleviated by removing the flanges from the rollers and operating the tape path without guiding elements.

However, such approach may introduce new challenges: Removing the guiding elements also removes a constraint on the lateral motion of the tape, which may result in an increase in amplitude of a typically low-frequency lateral tape motion. Specifically, an effect denoted as stack shift may become more prominent. Stack shifts are due to tape-stacking irregularities in the cartridge reel that lead to lateral tape motion events during normal operation of the drive. In general, stack shifts appear as high-amplitude low-frequency disturbances that can repeatedly be observed at the same longitudinal position when using the same cartridge.

An increased amplitude of a lateral tape motion may in addition increase a tape skew which in turn may degrade the performance of the tape storage device. Therefore, a compensation mechanism with respect to tape skew is desired.

BRIEF SUMMARY

In one embodiment, an apparatus for operating a tape storage device, includes a first tape skew determination configured to provide a first tape skew value concerning a skew of a tape in the tape storage device; a second tape skew determination unit configured to provide a second tape skew value concerning the skew of the tape, and an actuator configured to adjust one or more of: a rotational orientation of a tape head of the tape storage device, the tape head configured to read and/or write data from/to the tape; wherein a motion direction of the tape is dependent on the first tape skew value and the second tape skew value.

In another embodiment, a method for operating a tape storage device including a tape head for reading and/or writing data from/to a tape in the tape storage device is disclosed, and includes determining a first tape skew value concerning a skew of the tape; determining a second tape skew value concerning the skew of the tape; and adjusting at least one of: a rotational orientation of the tape head; and a tape motion direction of the tape dependent on the first tape skew value and the second tape skew value.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
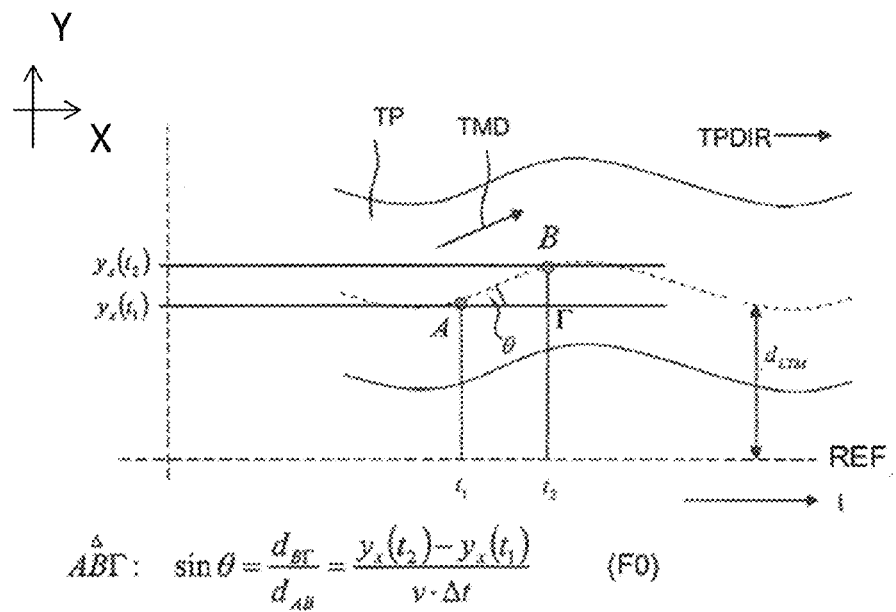
FIG. 1 is an illustration of a tape motion path.

According to one aspect of the invention, an apparatus for operating a tape storage device is provided, the apparatus comprising a first tape skew determination unit for providing a first tape skew value concerning a skew of a tape in the tape storage device, a second tape skew determination unit for providing a second tape skew value concerning the skew of the tape, and an actuator for adjusting one or more of a rotational orientation of a tape head of the tape storage device, which tape head is provided for reading and/or writing data from/to the tape and a tape motion direction of the tape dependent on the first tape skew value and the second tape skew value.

In embodiments, the apparatus may comprise one or more of the following features: the first tape skew determination unit is adapted to determine the first tape skew value by means of servo information read from at least two servo bands of the tape which servo information is prewritten to the at least two servo bands for allowing to determine a lateral position of the tape; the determined first tape skew value represents a skew angle between a motion direction of the tape, i.e., its current motion direction, and the rotational orientation of the tape head, i.e., its current rotational orientation; the second tape skew determination unit is adapted to determine the second tape skew value by means of servo information read from a single servo band of the tape, which servo information is prewritten to the servo band for allowing to determine a lateral position of the tape; the determined second tape skew value represents a skew angle between the motion direction of the tape, i.e., its current motion direction, and a reference motion direction of the tape; a skew feedback controller for converting a deviation of the first tape skew value from a reference skew value into a first skew control signal for the actuator; the skew feedback controller, the first tape skew determination unit and the actuator contribute to a closed-loop skew control system; a feed-forward controller for converting the second tape skew value into a second skew control signal for the actuator, and an adding element for adding the first skew control signal and the second skew control signal into a skew control signal for the actuator; wherein a transfer function of the feed-forward controller is based on an inverse transfer function of a model of the actuator.

The second tape skew determination unit comprises a first subunit for estimating a lateral tape position with respect to a lateral reference position by means of a model of a lateral position actuator for controlling a lateral position of the tape head, and a second subunit for determining the second tape skew value based on at least two consecutive lateral positions of the tape estimated by the first subunit; the first subunit is adapted to estimate the lateral tape position dependent on a difference between a determined lateral position of the tape with respect to the position of the actuator and a modeled lateral position of the actuator, which modeled lateral position of the actuator represents an output of the model of the lateral position actuator when supplied with a control signal for the lateral position actuator; a lateral position feedback controller for converting a deviation of the determined lateral tape position with respect to the actuator position into the control signal for the lateral position actuator, wherein the lateral position feedback controller, a lateral position determination unit and the lateral position actuator contribute to a closed-loop lateral position control system; the second tape skew determination unit comprises an optical detector for detecting a lateral position of the tape with respect to a lateral reference position, and a subunit for determining the second tape skew value dependent on at least two consecutive lateral positions of the tape detected by the optical detector.

According to another aspect of the present invention a method is provided for operating a tape storage device comprising a tape head for reading and/or writing data from/to a tape in the tape storage device, the method comprising: determining a first tape skew value concerning a skew of the tape, determining a second tape skew value concerning the skew of the tape, and adjusting at least one of a rotational orientation of the tape head, and a tape motion direction of the tape dependent on the first tape skew value and the second tape skew value.

In embodiments, the method may comprise one or more of the following features: the first tape skew value represents a skew angle between the motion direction of the tape and an orientation of the tape head, the second tape skew value represents a skew angle between the motion direction of the tape and a reference motion direction of the tape, the first tape skew value is converted into a first skew control signal by means of a feedback controller, the second tape skew value is converted into a second skew control signal by means of a feed forward controller, at least one of the rotational orientation of the tape head and the motion direction of the tape is controlled subject to a skew control signal dependent on an addition of the first skew control signal and the second skew control signal; the first tape skew value is derived from servo information read concurrently from the at least two servo bands of the tape which servo information is prewritten to the servo bands for determining a lateral position of the tape, the second tape skew value is derived from servo information read from a single servo band, which servo information is prewritten to the servo band for determining a lateral position of the tape; a lateral position of the tape with respect to a lateral reference position is detected by means of an optical detector, the second tape skew value is determined dependent on at least two consecutive lateral positions detected by the optical detector.

According to a further aspect of the present invention, a computer program product is provided comprising a computer readable medium having computer readable program code embodied therewith, the computer readable program code comprising computer readable program code configured to perform a method according to any one of the above embodiments.

It is understood that method operations may be executed in a different order than listed in a method claim. Such different order shall also be included in the scope of such claim as is the order as presently listed.

Embodiments described in relation to the aspect of an apparatus shall also be considered as embodiments disclosed in connection with any of the other categories such as the method, the computer program product, etc.

In the figures, same or similar elements are denoted by the same reference signs.

As an introduction to the following description, it is first pointed at a general aspect of the invention, concerning a skew compensation mechanism in a tape storage device.

A proper operation of a tape storage device which includes proper reading and/or writing data from/to a tape medium—in following denoted as tape—inserted into a tape drive of the tape storage device at high densities is inter alia dependent on a high precision alignment of a tape head of the tape storage device and the tape which tape head comprises read elements for reading data from the tape and write elements for writing data to the tape. Two effects can be observed in this context which may impair an operation of the tape storage device.

The first effect refers to a lateral displacement of the tape. Generally, the lateral displacement may be expressed as a deviation of the tape either with respect to a reference lateral tape position or with respect to a lateral position of the tape head. For determining any deviation, the current lateral tape position is measured which shall include any indirect determination of the lateral tape position. Any change of the lateral tape position over time is referred to as lateral tape motion.

Another effect is skew which skew equally may impact the operation of the tape storage device. Skew is generally understood as a rotational displacement of the tape, which rotational displacement occurs in a plane of the tape. In general, skew may represent an angle between a tape motion direction and a reference tape motion direction, or may represent an angle between the tape motion direction and a rotational orientation of the tape head, i.e., an orientation defined in a plane parallel to the plane of the tape. It is explicitly stated that the term "skew" shall refer to both variants, i.e., to an absolute skew as referred to in the above first variant, and to a relative skew as referred to in the above second variant. For determining any skew, the tape motion direction may be determined, which shall include measuring or any indirect determination of the tape motion direction. Hence, skew as such shall refer to both the rotational displacement of the motion direction of the tape versus the rotational orientation of the tape head, and to the rotational displacement of the motion direction of the tape versus a reference motion direction of the tape. The reference motion direction of the tape may be considered as a direction the tape ideally moves across the tape head given that the tape head is ideally oriented. Preferably, the reference motion direction is orthogonal to the ideal orientation of the tape head, and in absolute terms is parallel to an ideal tape path envisaged by rollers, flanges etc. in the tape storage device.

In this context, FIG. 1 illustrates skew and lateral displacement effects in a diagram representing a lateral tape motion direction TMD over time t. A tape TP is moved in a tape storage device from one reel to another reel during operation for allowing a tape head of the tape storage device to read and/or write data from/to the tape TP. In the diagram of FIG. 1, a lateral position $y_x(t)$ of a centerline of the tape TP is shown over time t as a dotted curve. The determined lateral tape position $y_x(t)$—also referred to as DLP—varies over time t due to lateral tape motion introduced by lateral disturbances as for example stack shifts. Since the lateral position $y_x(t)$ presently is scaled with respect to a reference lateral position REF which in the present case is $y_x=0$, the lateral tape position $y_x(t)$ at the same time represents a lateral displacement $d_{LTM}(t)$ which is also referred to as position error signal PES(t) over time t.

Hence, the displacement $d_{LTM}(t)$ over time t is shown by the dotted curve. Specifically, the tape centerline moves in Y-direction between first time $t_1$ and second time $t_2$ from A to B. As a result of such lateral displacement $d_{LTM}(t2)-d_{LTM}(t1)=y_x(t2)-y_x(t1)$ of the tape TP, a rotational displacement is introduced, too, which may be referred to by the arrow indicating the tape motion direction TMD. The current tape motion direction TMD as a result deviates from a reference tape motion direction TPDIR indicated by another arrow.

In this example, a skew of the tape TP may be represented by an absolute tape skew angle $\theta$ as the angle between the current tape motion direction TMD and the reference tape motion direction TPDIR, which in the present example is in parallel to a longitudinal direction X which typically represents the longitudinal extension of the tape TP in an ideal state. The absolute tape skew angle $\theta$ can be determined, for example, by means of the Formula F0 as shown in FIG. 1, wherein $y_x(t)$ denotes lateral displacements of the tape TP measured at consecutive points in time $t_1$ and $t_2$, while v denotes the velocity of the tape, and $\Delta t=t_2-t_1$ Hence, within the scope of a tape skew estimation in a tape skew determination unit, which in the following will be denoted as second tape skew determination unit DUS2, at least two consecutive current lateral tape positions of the tape with respect to a predetermined reference point are determined at a predetermined longitudinal capture position. At a first point of time $t_1$, a lateral tape position $y_x(t_1)$ is determined at a predetermined longitudinal capture position. At a second point of time $t_2$ a further lateral tape position $y_x(t_2)$ is determined at the same predetermined longitudinal capture position. Alternatively or additionally, both lateral tape positions $y_x(t_1)$, $y_x(t_2)$ may be derived from particular lateral positions $d_y$, derived from the position error signal PES. The particular lateral position $d_y$ represents a corresponding lateral tape position. The tape skew $\theta$ may then be derived by using equation F0 in FIG. 1, which represents a trigonometrical relation of triangle ABΓ.

A first triangle side $d_{B\Gamma}$ represents the lateral distance between both determined lateral tape positions $y_x(t_1)$, $y_x(t_2)$. A second triangle side $d_{AB}$ represents a distance in tape motion direction TMD, which results from the current tape velocity v and a time difference $\Delta t$. The time difference $\Delta t$ represents a time lag between the first and the second point of time $t_1$, $t_2$.

Figure 2:
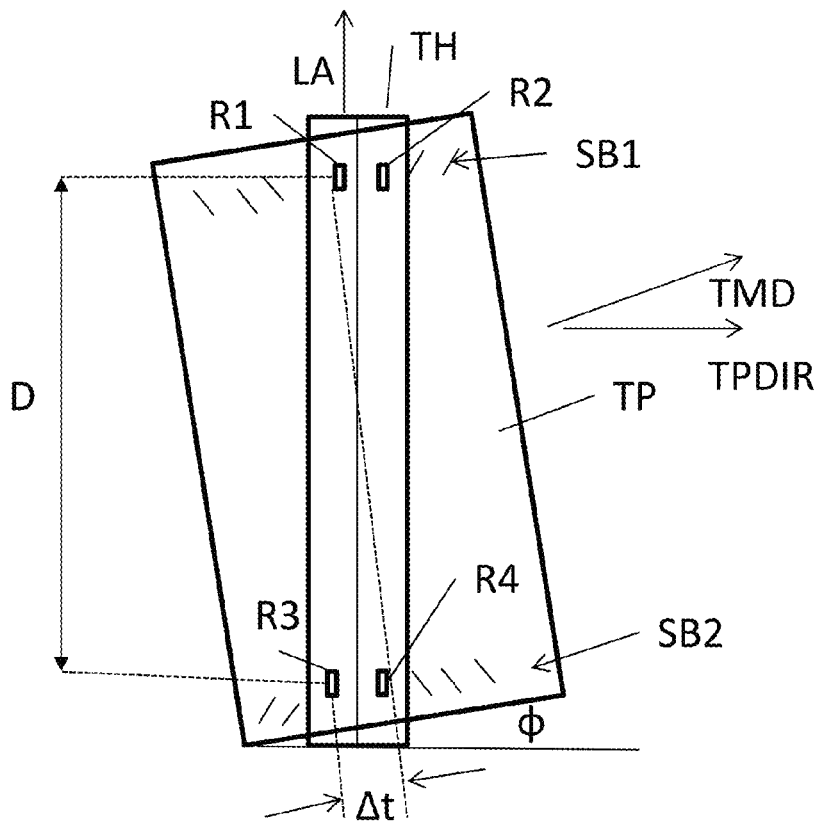
FIG. 2 is a cutout of a tape skewed with respect to a tape head in a top view.

For determining a lateral position $y_x(t)$ of the tape TP servo information may be prewritten to servo bands of the tape TP. Servo bands represent longitudinal bands on the tape TP—i.e., in X-direction according to FIG. 1—which alternate with data bands on the tape TP. There may be two or more servo bands provided on the tape TP. Each servo band preferably contains servo patterns which are prerecorded. During operation of the tape storage device, the servo patterns of at least one servo band are read by a read element of a tape head the tape TP is moved across. The information inherent in the servo patterns and read by a read element—which read element may be solely dedicated for reading the servo pattern but not any data and as such may also be referred to as servo element—allows to determine a lateral position of the tape when crossing the servo read element. In FIG. 2, a cutout of a tape TP is shown with two servo bands SB1 and SB2 at the edges of the tape TP. Each servo band SB1 and SB2 contains servo patterns with sequences of parallel magnetically oriented stripes of different azimuth slopes. These servo patterns may follow a technology called timing-based servo TBS. In TBS systems, recorded servo patterns comprise of transitions with two different azimuthal slopes. The tape head lateral position is derived from the relative timing of pulses generated by a servo reader reading the servo pattern. The servo patterns may, for example, be written on five dedicated servo bands that straddle four data bands. The complete format for linear tape open LTO tape drives of the first generation was standardized by the European Computer Manufacturers Association (ECMA) in 2001 as ECMA-319. Reference is made to this source for gaining more insight about the timing based servo patterns.

Figure 3:
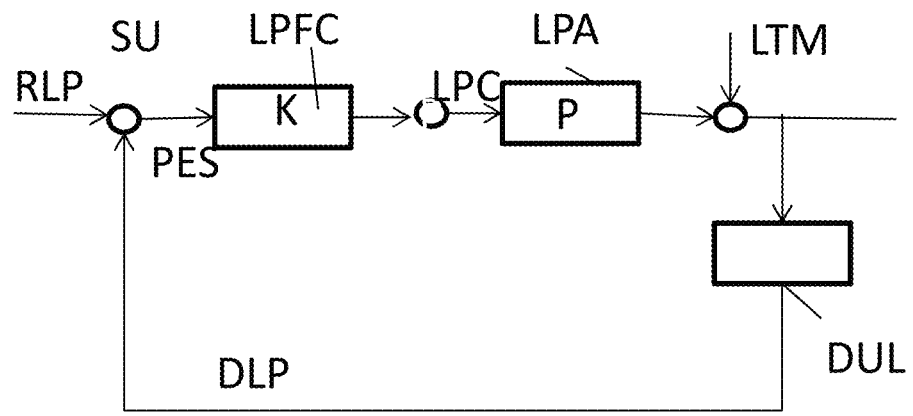
FIG. 3 is a block diagram of a closed-loop lateral position control system as used in one embodiment of the present invention.

Hence the servo pattern of a servo band is read by a servo reader. The information read allows for determining the lateral position of the tape, preferably with reference to a lateral reference position. Reference is now made to the block diagram of FIG. 3 which inter alia shows a closed-loop lateral position control system as used in an embodiment of an apparatus of the present invention. The servo reader and additional logic or software for evaluating the servo reading results are summarized as lateral position determination unit DUL for measuring/determining a lateral position DLP of the tape TP with respect to the actuator LPA. A deviation PES between the determined lateral position DLP and a reference lateral position RLP is determined in subtracting unit SU. The deviation PES over time t is referred to as the position error signal PES(t), which illustrates a magnitude of a misalignment of the tape head relative to the tape. The position error signal PES is typically fed to a lateral position feedback controller LPFC—which is also denoted as track-follow controller in some instances—for converting the position error signal PES into a lateral position control signal LPC for a lateral position actuator LPA. The lateral position actuator LPA repositions the tape head by means of a head actuator in response to the lateral position control signal LPC for continuously following the data tracks in the presence of lateral tape motion disturbances LTM. Hence, the measured/determined lateral position DLP is used to continuously realign the tape head with the tape, which specifically includes a realignment of read and write elements of the tape head with assigned track centerlines of data tracks of the tape. Such mode is also denoted as track following mode. The feedback controller transfer function $K_L$ may be based on PID, lead-lag or more advanced optimal control designs, while a sample transfer function $P_L$ of the lateral position actuator may be based on a simple second order system.

Summarizing, storage media typically comprise servo information prerecorded in one or more of dedicated servo bands that extend next to data tracks for storing data, which servo bands extend in a longitudinal direction along the tape. A servo band typically is read by at least one dedicated servo reader of a tape head of a tape drive, into which a cartridge containing the tape media is inserted to. The servo information read from at least one servo band allows for determining a lateral deviation of the tape. A position error signal supplied by one or more of the servo readers may be translated into a control signal for the lateral position actuator for controlling the lateral position of the tape head with respect to the tape. A positioning accuracy of the track-follow control system may have impact on the density data can be written to tape since the displacement allowed finally determines the density at which tracks can be packed onto the tape.

In a preferred embodiment, the servo patterns prerecorded on the tape may additionally be used for determining a skew of the tape, and specifically for determining a skew of the tape relative to the tape head. This concept is illustrated in FIG. 2: A cutout of a skewed tape TP is shown which moves in motion direction TMD, which is displaced by skew angle Φ from a reference motion direction TPDIR and from an alignment of a tape head TH the tape TP crosses. In the present example the tape head TH with its rotational orientation LA is perfectly orthogonally aligned with respect to the reference motion direction TPDIR of the tape TP. However, the orientation LA of the tape head TH is rotationally misaligned with respect to the current tape motion direction TMD by skew angle Φ. On the tape edge, the two servo bands SB1 and SB2 are provided as explained above. The tape head TH comprises read elements R1, R2 for reading the pattern of the first servo band SB1 and read elements R3, R4 for reading the patterns of the second servo band SB2. A distance between the read elements R1 and R3 or R2 and R4 respectively for reading the two servo bands SB1 and SB2 is denoted as distance D, which at the same time should be a distance between the two servo bands SB1 and SB2.

According to the formula $$\Phi = \arctan(v\Delta t/D) \quad (F1):$$

by means of reading consecutive information from the two servo bands SB1 and SB2, the relative skew angle Φ between the tape TP and the tape head TH may be determined, wherein Δt denotes the time interval between a single servo pattern on the second servo band SB2 being read by the servo reader R3 and subsequently being read by the servo reader R4. v again denotes the velocity of the tape TP at which the tape TP is moved across the tape head TH.

Figure 4:
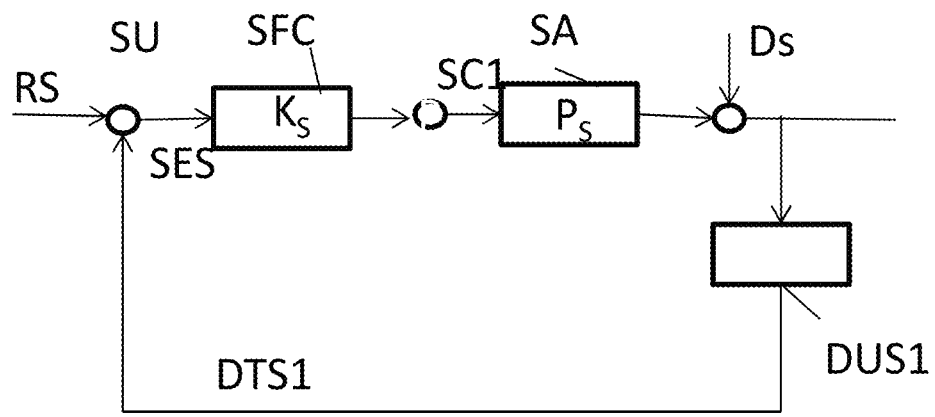
FIG. 4 a block diagram of a closed-loop skew control system as used in one embodiment of the present invention.

The above findings may be implemented in a determination unit referred to as first tape skew determination unit DUS1 in the following, see the block diagram of FIG. 4. Hence, the first tape skew determination unit DUS1 may be considered as sensor or measuring unit for identifying the current skew of the tape, which skew in this example is a relative skew Φ between the current tape motion direction TMD and the current rotational orientation LA of the tape head TH, since the servo readers of the tape head may in this example only derive the relative skew from the servo patterns while a misalignment of the tape head itself is unknown to such detection system. By means of such first tape skew determination unit DUS1, a first tape skew value DTS1 may be determined. Such first tape skew value DTS1 may in this example be determined from the reading of servo information from two servo bands as introduced above. Preferably, such first tape skew value DTS1 may represent a relative skew angle Φ between the tape TP and the tape head TH for the reason that the information for determining the tape skew is read by the tape head which does not know about its own possible displaced orientation. However, the first tape skew value may be determined in a different way such that the first tape skew determination unit may include other means for determining skew of the tape, be it as absolute measure or as relative measure.

The determined first tape skew value DTS1 may be used in a closed-loop skew control system for controlling a suitable skew actuator SA for adjusting the skew in dependency from the determined first tape skew value DTS1. Such a sample closed-loop control system is illustrated in FIG. 4. In a subtracting unit SU the first tape skew value DTS1 is subtracted from a reference tape skew value RS which—for the reason that the first tape skew value DTS1 in the present embodiment is a skew measure relative to the rotational orientation of the tape head TH—may for example be set to 0 degrees. The skew error signal SES consequently represents a deviation of the first tape skew value DTS1 from the reference tape skew value RS such that a skew feedback-controller SFC with a transfer function $K_s$ may convert the deviation information inherent in the SES signal into a first skew control signal SC1 that is fed to a skew actuator SA. The skew actuator SA which may have a transfer function $P_s$ and adjusts the tape skew such that the tape motion direction TMD and the rotational orientation of the tape head TH will become better aligned again. In the block chart of FIG. 4, the signal Ds denotes disturbances that may impact the tape motion direction TMD, and that—in a closed-loop skew control system as presently provided—may impact an adjusted skew such that such new skew deviations may be sensed by the first tape skew determination unit DUS1, which deviations again are manifested in the SES signal.

The skew actuator SA may be an actuator acting on a rotational orientation of the tape head. In such embodiment, the tape head TH may have a rotational bearing, and a rotational position of the tape head TH with respect to the tape TP may be modified by actuating the skew actuator SA. Hence, by the skew actuator SA, the rotational head position θ of the tape head TH may be controlled in a plane predetermined by the longitudinal direction X and the lateral direction Y, see FIG. 2—dependent on the first skew control signal SC1. The skew actuator SA acting on the rotational position of the tape head TH may also be operable to control the lateral tape head position as is needed in the closed-loop lateral position control system of FIG. 3, and as such also embody the lateral position actuator LPA of FIG. 3.

Figure 7:
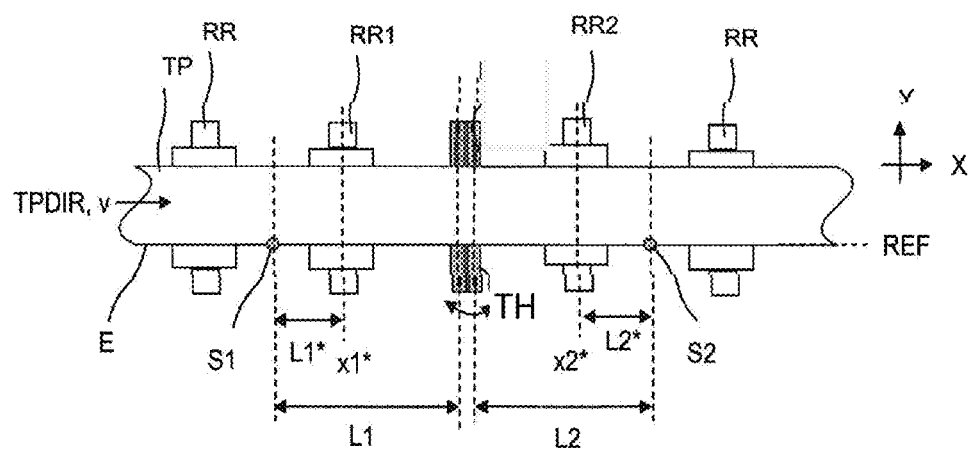
FIG. 7 an illustration of a tape path in a tape drive as used in one embodiment of the present invention.

However, the skew actuator SA may act on other means, too. The skew actuator SA may also act on a tilting of rollers as will be explained in connection with FIG. 7. FIG. 7 illustrates a lateral extension of a tape path. A tape TP may move in a forward direction along a longitudinal direction X. The forward direction represents a reference tape transport direction TPDIR along the longitudinal direction X where the tape TP passes for example the tape head TH. A reverse direction of the tape TP is reversed with respect to the forward direction. The tape TP is inserted in a tape drive which tape drive is controlled for moving for the tape back and forth. The tape TP in motion is supported by a first and a second tape roller RR1, RR2 positioned next to the tape head TH on opposite sides of the tape head TH in longitudinal direction X. The first and the second tape roller RR1, RR2 are directly in contact with the tape TP and may, in this example, be operable to actively tilt the tape TP dependent on the predetermined first skew control signal. For that purpose, the first and second tape roller RR1, RR2 may be operable to tilt in longitudinal direction X. The first and second tape roller RR1, RR2 are also identified as tilting elements. The storage device may comprise the skew actuator SA being operable to control the rotational position of the tape TP and/or at least one tilting element being operable to tilt the tape TP. Additional tape rollers RR, may be associated to the tape path, wherein all tape rollers RR, RR1, RR2 for example, may be flangeless rollers. The tape head TH may in one embodiment comprise at least a first and a second head module with each head module comprising at least one read and one write element and at least one servo element.

In case the first determination unit as described above relies on reading servo information from two servo bands concurrently for determining the current skew, both associated servo channels need to be active. A failure in reading at least one of the two servo bands may lead to the skew following control not providing the desired control of the skew.

Therefore, the second tape skew determination unit DUS2 is provided. The second tape skew determination unit DUS2 may determine a skew related measure—be it related to absolute skew or to relative skew—such that the actuator SA is controlled subject to both the output of the first tape skew determination unit DUS1, i.e., the first tape skew value DTS1, and the output of the second tape skew determination unit DUS2, i.e., a second tape skew value DTS2, such that on the one hand the overall performance of the skew control is enhanced, and at the same time a fail-safe mechanism is introduced since the skew control may continue to be operable even if one of the tape skew determination units DUS1, DUS2 and/or underlying infrastructure fails, for the reason, that the other tape skew determination unit DUS2, DUS1 may take over and at least provide a skew control service sufficient for maintaining the tape storage device operable.

In this regard, it is preferred that the first and the second tape skew determination unit DUS1, DUS2 rely on different measuring principles for determining the skew. This may include that in a first embodiment, one of the tape skew determination units DUS1, DUS2 provides an absolute skew value while the other determination unit DUS2, DUS1 provides a relative skew value. In another embodiment, the tape skew determination units DUS1, DUS2 may rely on different measurement principles, such that, for example, the first tape skew determination unit DUS1 derives the first tape skew value DTS1 from information of two concurrently read servo bands while the other tape skew determination unit DUS2 derives the second tape skew value DTS2 from information read from a single servo band. The single servo band used here may be one of the at least two servo bands that are used for determining the first tape skew value DTS1, or may be a different one. In another embodiment, the two tape skew determination units DUS1, DUS2 may differ in the underlying hard- and/or software such that, for example, the first tape skew determination unit DUS1 relies on computing means different from computing means the second tape skew determination unit DUS2 relies on. All these embodiments may be applied individually or in combinations such that a quality of the fail-safe mechanism may be raised.

Figure 5:
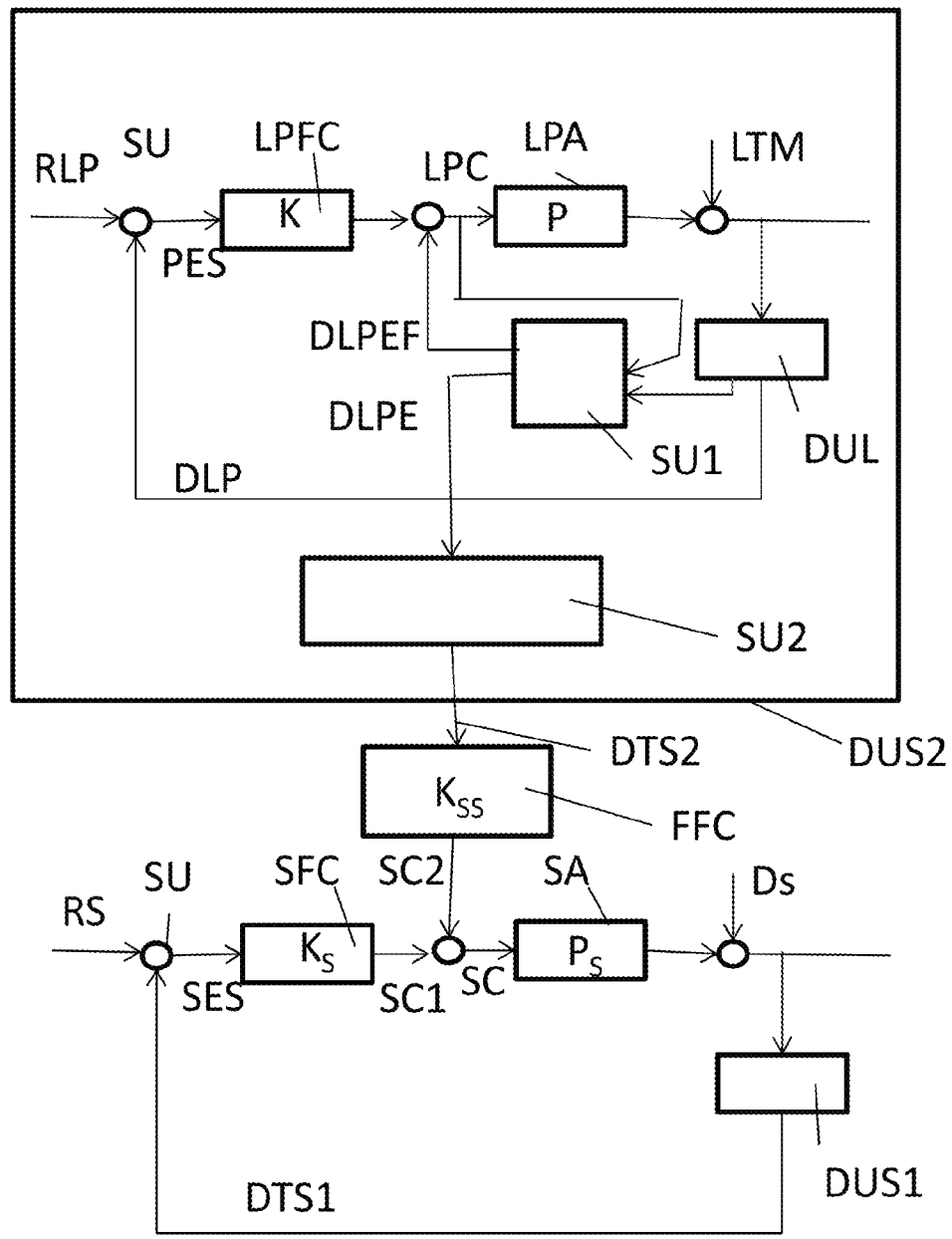
FIG. 5 a block diagram of an apparatus according to one embodiment of the present invention.

As an example of the second determination unit DUS2, it is referred to FIG. 5. FIG. 5 illustrates a block diagram of a sample second determination unit DUS2. The second determination unit DUS2 basically makes of use of the closed loop lateral position control system of FIG. 3 and uses the information gathered there. With respect to the elements, functions and operation of the closed loop lateral position control system it is referred to the description associated with FIG. 3. Again, the lateral position determination unit DUL may be based on reading a single servo band and determining the lateral position information from the read servo information. However, such lateral position information in form of lateral position values DLP allows also for estimating a value related to skew wherein the following is denoted as second tape skew value DTS2.

Figure 6:
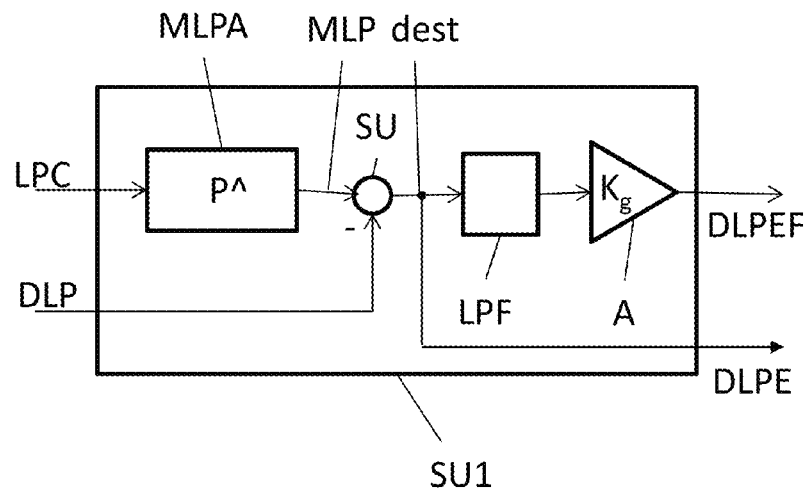
FIG. 6 a block diagram of a disturbance observer as used in the apparatus of FIG. 5.

For this purpose, a first subunit SU1 is added to the closed-loop lateral position control system. The first subunit may also be called "disturbance observer". The disturbance observer SU1 provides a lateral tape position estimate DLPE and a filtered and amplified lateral tape position estimate DLPEF. For this purpose the disturbance observer SU1 comprises a model MLPA of the lateral position actuator LPA used in the control-loop for controlling a lateral position of the tape head TH. Such model MLPA may be represented by a transfer function P^ modeling the transfer function P of the lateral position actuator LPA as can be derived from the disturbance observer SU1 according to FIG. 6. This disturbance observer SU1 uses the lateral position control signal LPC and the lateral position value DLP as measured/determined by the lateral position determination unit DUL as input. A deviation $d_{est}$ between the determined lateral position value DLP and a modeled lateral position value MLP is determined at the subtraction unit SU. The output $d_{est}$ at the disturbance observer SU1 represents an estimated lateral tape position estimate DLPE. Hence, the disturbance observer SU1 provides an estimate of the lateral tape motion at each time instant that is used to estimate the tape skew. The deviation $d_{est}$ is filtered by the low pass filter LPF and amplified by amplifier A with a transfer function $K_g$ to provide a filtered and amplified lateral tape position estimate DLPEF to form the lateral position control signal LPC.

According to FIG. 5, a second subunit SU2 is provided for finally determining the second tape skew value DTS2 dependent on at least two lateral positions estimations DLPE estimated by means of the first subunit SU1 consecutive in time. These values are used in the second subunit for determining the second tape skew value DTS2 according to formula $$DTS2 \sim \theta = \arcsin\{(d_{est}(t2) - d_{est}(t1))/(v\Delta t)\}. \quad (F2):$$

The second tape skew value DTS2 represents a tape skew estimated by means of the closed-loop lateral position control system, the disturbance observer SU1 and the second subunit SU2 for determining the skew angle θ—which is an absolute skew angle in the present example. The second tape skew value DTS2 is then applied via a feed-forward controller FFC with a transfer function $K_{ss}$ according to FIG. 5, which can be based on an inverse-model of the skew actuator, to the closed-loop skew control system according to FIG. 4, which entire block diagram is shown in FIG. 5. Accordingly, the feed-forward system is used to enhance the closed-loop skew control system, which is also denoted as skew feedback control system. The advantage in this case is that the combination of the feed-forward controller FFC and the skew feedback controller SFC provides an improved performance compared to a stand-alone skew feedback controller SFC. A second skew control signal SC2 as output of the feed forward controller FFC is added to the first skew control signal SC1 such the skew actuator SA is controlled subject to a skew control signal SC that is dependent on the first skew control signal SC1 and the second skew control signal SC2.

Another advantage of the above system may be apparent when assuming that, for example, one or more of the servo channels—i.e., servo band and associate read functionality—is not operational either temporarily or permanently. Then the second tape skew determination unit DUS2 can be used in a stand-alone model. Even if in some cases there may be observed a small performance loss as compared to the full operational skew-follow system of FIG. 5, the tape storage device drive remains functional.

In a further embodiment, the tape skew estimate used by the feed-forward controller is obtained by using a lateral position measurement by means of a dedicated sensor, for example, by means of an optical sensor which may be placed in the tape path prior to the tape head. In an example making use of such a dedicated sensor for determining lateral position information of the tape, at least one tape edge of the tape is observed. At least two consecutive lateral tape positions are determined dependent on the at least one observed tape edge. This facilitates a reliable determination of the current lateral tape position by other means than reading the servo information. Hence, the second tape skew determination unit DUS2 may, instead of obtaining information from a single servo band, use information provided by preferably such one or more optical sensors for monitoring the tape edge E as will be shown in FIG. 7. A first sensor S1 at a first longitudinal position x1 and a second sensor S2 at a second longitudinal position x2 are associated to the tape path as shown in FIG. 7. Both sensors S1, S2 may be optical sensors, as for example light barriers, photo detectors or an array of photo detectors. Subject to the tape edge position, the tape edge may obstruct a part of the light beam emitted from the photodiode and therefore provides a measure of the lateral position of the tape, in this example. The first and the second sensor S1, S2 are positioned on opposite sides of the tape head TH with respect to the longitudinal direction X. Furthermore, the first sensor S1 and the second sensor S2 are positioned on opposite sides of the first and the second tape roller RR2, RR1. A first longitudinal distance L1 represents a distance between the first longitudinal position x1 and the tape head TH. A second longitudinal distance L2 represents a distance between the second longitudinal position x2 and the tape head TH. A further first longitudinal distance L1* represents a distance between the first longitudinal position x1 and a further first longitudinal position x1* of the first tape roller RR1. A further second longitudinal distance L2* represents a distance between the second longitudinal position x2 and a further second longitudinal position x2* of the second tape roller RR2. Each sensor S1, S2 is preferably operable to observe a tape edge E. The first sensor S1 is further operable to provide a first output sensor signal dependent on the observed tape edge E. The first output sensor signal represents a first lateral tape position $y_{x1}(t)$ with respect to a predetermined reference point REF at the first longitudinal position x1. The second sensor S2 is operable to provide a second output sensor signal dependent on the observed tape edge E. The second output sensor signal represents a second lateral tape position $y_{x2}(t)$ with respect to a predetermined reference point REF at the second longitudinal position x2. The reference point REF may by way of example be a lateral position of the first and second sensor S1, S2. The first longitudinal position x1 and the second longitudinal position x2 are also identified as longitudinal capture positions. Such lateral positions of the tape, in the previous embodiments also denoted as DLP, allows for a determination of the tape skew by means of a subunit which may be identical to the second subunit in the previous embodiment, i.e., a subunit which derives the skew angle by means of triangulation from two consecutive longitudinal position values. The remaining system is as is shown in the context of FIG. 5.

The above embodiment is beneficial in that two different hardware sets are used for determining the first and the second tape skew determination values DTS1 and DTS2 which may improve the fail-safe mechanism of the apparatus. A further advantage is that the optical sensor measurement provides advance information on the tape skew, as one of the subject sensors, depending on the tape transport direction, provides information ahead of such information being accessible at the tape head TH.

Figure 8:
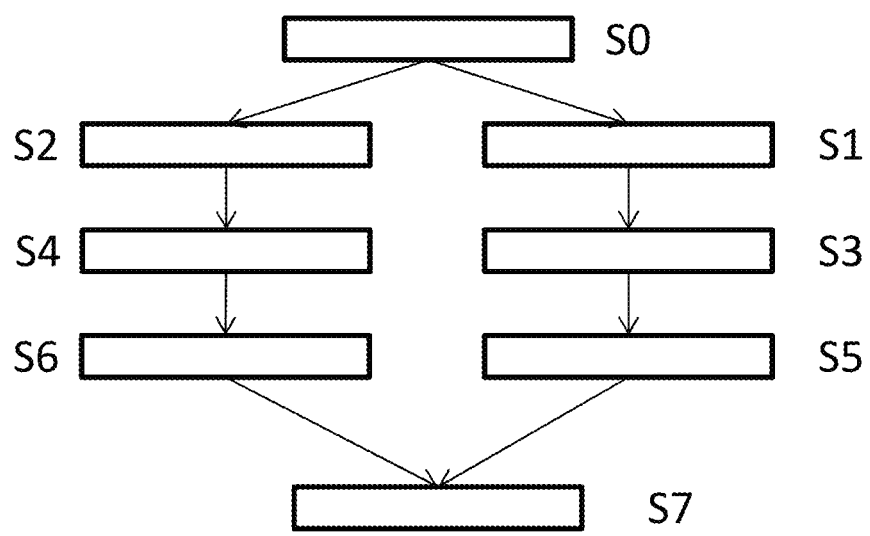
FIG. 8 a flowchart according to an embodiment of the present invention.

A method according to the flow chart of FIG. 8 is for example executed by a controller unit of the tape storage device, as for example a microcontroller. The controller unit may also be identified as an apparatus for operating the storage device. The program in FIG. 8 represents a tape skew control method according to an embodiment of the present invention.

The execution of the program starts in block S0. In block S2, two consecutive lateral tape positions $y_x(t_1))=DLPE(t1)$, $y_x(t_2)=DLPE(t2)$ are estimated. Additionally, further lateral tape positions may be estimated. The at least two lateral tape positions $y_x(t_1)$, $y_x(t_2)$ may be derived from a position error signal PES, for example by using an actuator model MLPA. Alternatively or additionally, the at least two lateral tape positions $y_x(t_1)$, $y_x(t_2)$ may be estimated dependent on the first or second lateral tape position $y_{x1}(t)$, $y_{x2}(t)$ provided by the first or second optical sensors S1, S2 dependent on the tape transport direction TPDIR.

In block S4, the tape skew θ is for example determined dependent on the at least two lateral tape positions $y_x(t_1)$, $y_x(t_1))$ and the current tape velocity v and the time difference Δt. The tape skew θ may be determined by using equation F0 in FIG. 1 and calculating its arc sinus.

In block S6, tape skew θ, which is considered as second tape skew value DTS2, is fed to a feed forward controller, and the feed forward controller provides a second control signal in response to the second tape skew value.

In block S1, a time Δt between the appearance of a servo pattern at two consecutive servo readers arranged at the tape head is determined. In block S3, a relative tape skew angle Φ is determined by calculating Formula (F1).

In block S5, skew error signal SES is determined dependent on the determined tape skew Φ, the skew error signal is input to a skew feedback controller, and the skew feedback controller provides a first skew control signal.

In block S7 the first and the second control signal are added and the resulting control signal is controlling the skew actuator.

The blocks S2, S4 and S6 may be executed in parallel or quasi-parallel with blocks S1, S3 and S5. Those sequences of operations, however, may also be executed sequentially.

Generally, the present tape skew determination and control system may be based in one embodiment on a tape skew estimated by means of the track-follow control system which estimated tape skew—i.e., is the second tape skew value DTS2—can be utilized in a skew follow control system comprising a skew actuator. For estimating the above tape skew a feed-forward controller is designed based on the model of the skew actuator. Therefore, the feed-forward scheme can be used to enhance a closed-loop skew control system. The feed-forward controller can be used as stand-alone controller for the skew actuator if needed.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for operating a tape storage device, comprising:
   a first tape skew determination unit configured to provide a first tape skew value concerning a skew of a tape in the tape storage device;
   a second tape skew determination unit configured to provide a second tape skew value concerning the skew of the tape, and
   an actuator configured to adjust one or more of:
   a rotational orientation of a tape head of the tape storage device, the tape head configured to read and/or write data from/to the tape;
   wherein a motion direction of the tape is dependent on the first tape skew value and the second tape skew value.

2. The apparatus according to claim 1, wherein the first tape skew determination unit is adapted to determine the first tape skew value based on servo information read from at least two servo bands of the tape, which servo information is prewritten to the at least two servo bands for allowing to determine a lateral position of the tape.

3. The apparatus according to claim 2, wherein the determined first tape skew value represents a skew angle between the motion direction of the tape and a rotational orientation of the tape head.

4. The apparatus according to claim 1, wherein the second tape skew determination unit is adapted to determine the second tape skew value by servo information read from a single servo band of the tape, which servo information is prewritten to the servo band for allowing to determine a lateral position of the tape.

5. The apparatus according to claim 4, wherein the determined second tape skew value represents a skew angle between the motion direction of the tape and a reference motion direction of the tape.

6. The apparatus according to claim 1, further comprising:
a skew feedback controller configured to convert a deviation of the first tape skew value from a reference skew value into a first skew control signal for the actuator.

7. The apparatus according to claim 6, wherein the skew feedback controller, the first tape skew determination unit and the actuator contribute to a closed-loop skew control system.

8. The apparatus according to claim 6, further comprising:
a feed-forward controller configured to convert the second tape skew value into a second skew control signal for the actuator; and
an adding element configured to add the first skew control signal and the second skew control signal into a skew control signal for the actuator.

9. The apparatus according to claim 8, wherein a transfer function of the feed-forward controller is based on an inverse transfer function of a model of the actuator.

10. The apparatus according to claim 1, wherein the second tape skew determination unit comprises:
a first subunit configured to estimate a lateral tape position by a model of a lateral position actuator configured to control a lateral position of the tape head; and
a second subunit configured to determine the second tape skew value based on at least two consecutive lateral positions of the tape estimated by the first subunit.

11. The apparatus according to claim 10, wherein the first subunit is adapted to estimate the lateral tape position dependent on a difference between a determined lateral position of the tape with respect to a position of the actuator and a modeled lateral position of the tape, which modeled lateral position of the tape represents an output of the model of the lateral position actuator when supplied with a control signal for the lateral position actuator.

12. The apparatus according to claim 11, further comprising:
a lateral position feedback controller configured to convert a deviation of the determined lateral tape position with respect to a position of the actuator into the control signal for the lateral position actuator; and
a lateral position determination unit configured to determine the lateral tape position;
wherein the lateral position feedback controller, the lateral position determination unit, and the lateral position actuator contribute to a closed-loop lateral position control system.

13. The apparatus according to claim 1, wherein the second tape skew determination unit comprises:
an optical detector configured to detect a lateral position of the tape; and
a subunit configured to determine the second tape skew value dependent on at least two consecutive lateral positions of the tape detected by the optical detector.

14. A method for operating a tape storage device comprising a tape head for reading and/or writing data from/to a tape in the tape storage device, the method comprising:
determining a first tape skew value concerning a skew of the tape;
determining a second tape skew value concerning the skew of the tape; and
adjusting at least one of:
a rotational orientation of the tape head; and
a tape motion direction of the tape dependent on the first tape skew value and the second tape skew value.

15. The method according to claim 14,
wherein the first tape skew value represents a skew angle between the motion direction of the tape and the rotational orientation of the tape head;
wherein the second tape skew value represents a skew angle between the motion direction of the tape and a reference motion direction of the tape;
wherein the first tape skew value is converted into a first skew control signal by means of a skew feedback controller;
wherein the second tape skew value is converted into a second skew control signal by means of a feed forward controller; and
wherein at least one of the rotational orientation of the tape head and the motion direction of the tape is controlled subject to a skew control signal dependent on an addition of the first skew control signal and the second skew control signal.

16. The method according to claim 14,
wherein the first tape skew value is derived from servo information read concurrently from the at least two servo bands of the tape which servo information is prewritten to the servo bands for determining a lateral position of the tape; and
wherein the second tape skew value is derived from servo information read from a single servo band which servo information is prewritten to the servo band for determining a lateral position of the tape.

17. The method according to claim 14,
wherein a lateral position of the tape with respect to a lateral reference position is detected by means of an optical detector; and
wherein the second tape skew value is determined dependent on at least two consecutive lateral positions detected by the optical detector.

18. A computer program product comprising a computer readable medium having computer readable program code embodied therewith, the computer readable program code comprising computer readable program code configured to perform a method according to claim 14.

* * * * *